US007260532B2

(12) United States Patent
Rees

(10) Patent No.: US 7,260,532 B2
(45) Date of Patent: Aug. 21, 2007

(54) HIDDEN MARKOV MODEL GENERATION APPARATUS AND METHOD WITH SELECTION OF NUMBER OF STATES

(75) Inventor: David Llewellyn Rees, Berkshire (GB)

(73) Assignee: Canon Kabushiki Kaisha, Tokyo (JP)

( * ) Notice: Subject to any disclaimer, the term of this patent is extended or adjusted under 35 U.S.C. 154(b) by 856 days.

(21) Appl. No.: 10/288,517

(22) Filed: Nov. 6, 2002

(65) Prior Publication Data

US 2003/0163313 A1 Aug. 28, 2003

(30) Foreign Application Priority Data

Feb. 26, 2002 (GB) ................................ 0204474.1

(51) Int. Cl.
*G10L 15/00* (2006.01)

(52) U.S. Cl. ...................................................... 704/256

(58) Field of Classification Search ................. 704/256
See application file for complete search history.

(56) References Cited

U.S. PATENT DOCUMENTS

| | | | | |
|---|---|---|---|---|
| 5,839,105 | A | 11/1998 | Ostendorf et al. | 704/256 |
| 5,873,061 | A | 2/1999 | Häb-Umbach et al. | 704/254 |
| 5,895,448 | A | 4/1999 | Vysotsky et al. | 704/251 |
| 5,950,158 | A | 9/1999 | Wang | 704/244 |
| 6,240,389 | B1 | 5/2001 | Keiller et al. | 704/243 |
| 2002/0173953 | A1 * | 11/2002 | Frey et al. | 704/226 |

FOREIGN PATENT DOCUMENTS

WO WO 02/29612 4/2002

OTHER PUBLICATIONS

Daniel Gildea, et al., "Applying Pronunciation Modeling Techniques To French", International Computer Science Institute, University of California at Berkeley, Berkeley, CA.

Jay J. Lee, et al., "Data-driven Design of HMM Topology for On-Line Handwriting Recognition", Dept. of Electrical Engineering & Computer Science, KAIST, Taejon, Korea, pp. 1-14.

Rabiner, et al., "Fundamentals of Speech Recognition", Prentice Hall Signal Processing Series, Chapter 6, pp. 382-384 (1993).

"Automatically Finding The Number of States in a Video Sequence", Computer Vision Group, Computer Science, University of Bonn, Adaptive Background Modeling Using a Hidden Markov Model, http://www-dbv.informatik.uni-bonn.de/Video/page_3.html.

Finesso, Lorenzo, "The Complexity of Hidden Markov Models", ERCIM News Online Edition, http://www.ercim.org/publication/Ercim_News/enw40/finesso.html.

* cited by examiner

*Primary Examiner*—David Hudspeth
*Assistant Examiner*—Jakieda Jackson
(74) *Attorney, Agent, or Firm*—Fitzpatrick, Cella, Harper & Scinto

(57) ABSTRACT

A model generation unit (17) is provided. The model generation unit includes an alignment module (80) arranged to receive pairs of sequences of parameter frame vectors from a buffer (16) and to perform dynamic time warping of the parameter frame vectors to align corresponding parts of the pair of utterances. A consistency checking module (82) is provided to determine whether the aligned parameter frame vectors correspond to the same word. If this is the case the aligned parameter frame vectors are passed to a clustering module (84) which groups the parameter frame vectors into a number of clusters. Whilst clustering the parameter frame vectors, the clustering module (80) determines for each grouping an objective function calculating the best fit of a model to the clusters per degrees of freedom of that model. When the best fit per degrees of freedom is determined, the parameter frame vectors are passed to a hidden Markov model generator (86) which generates a hidden Markov model having states corresponding to the clusters determined to have the best fit per degrees of freedom.

26 Claims, 8 Drawing Sheets

HIDDEN MARKOV MODEL GENERATION APPARATUS AND METHOD WITH SELECTION OF NUMBER OF STATES

CROSS-REFERENCE TO RELATED APPLICATIONS

Not Applicable

BACKGROUND OF THE INVENTION

1. Field of the Invention

The present invention relates to model generation apparatus and methods. Embodiments of the present invention concern the generation of models for use in pattern recognition. In particular, embodiments of the present invention are applicable to speech recognition.

2. Description of Related Art

Speech recognition is a process by which an unknown speech utterance is identified. There are several different types of speech recognition systems currently available which can be categorised in several ways. For example, some systems are speaker dependent, whereas others are speaker independent. Some systems operate for a large vocabulary of words (>10,000 words) while others only operate with a limited sized vocabulary (<1000 words). Some systems can only recognise isolated words whereas others can recognise phrases comprising a series of connected words.

Hidden Markov models (HMM's) are typically used for the acoustic models in speech recognition systems. These consist of a number of states each of which are associated with a probability density function. Transitions between the different states are also associated with transition parameters.

Methods such as the Baum Welch algorithm such as is described in "Fundamentals of Speech Recognition" Rabiner & Hwang Juang, PTR Prentice Hall ISBN 0-13-15157-2 which is hereby incorporated by reference are often used to estimate the parameter values for hidden Markov models from training utterances. However, the Baum Welch algorithm requires the initial structure of the models including the number of states to be fixed before training can begin.

In a speaker dependent (SD) speech recognition, an end user is able to create a model for any word or phrase. In such a system the length of particular words or phrases which are to be modelled will not therefore be known in advance and an estimate of the required number of states must be made.

In U.S. Pat. No. 5,895,448 a system is described in which an estimate of the required number of states is based on the length of the phrase or word being modelled. Such an approach will however result in models having an inappropriate number of states where a word or phrase is acoustically more complex or less complex then expected.

There is therefore a need for apparatus and method which can discern an appropriate number of states to be included in a word or phrase models. Further there is a need for model generation systems which enables models to be generated simply and efficiently.

SUMMARY OF THE INVENTION

It is an object of the present invention to provide a speech model generation apparatus for generating models of detected utterances comprising:

a detector operable to detect utterances and determine a plurality of features of a detected utterance of which a model is to be generated;

a processing unit operable to process determined features of a detected utterance determined by said detector to generate a model of the utterance detected by said detector, said model comprising a number of states, each of said number of states being associated with a probability density function; and a model testing unit operable to process features of a detected utterance to determine the extent to which a model having an identified number of states will model the determined features of said detected utterance; wherein said processing unit is operable to select the number of states in a model generated to be representative of an utterance detected by said detector in dependence upon the determination by said model testing unit of an optimal number of states to be included in said generated model for said detected utterance.

BRIEF DESCRIPTION OF THE SEVERAL VIEWS OF THE DRAWINGS

An exemplary embodiment of the invention will now be described with reference to the accompanying drawings in which.

DETAILED DESCRIPTION OF THE INVENTION

Embodiments of the present invention can be implemented in computer hardware, but the embodiment to be described is implemented in software which is run in conjunction with processing hardware such as a personal computer, workstation, photocopier, facsimile machine, personal digital assistant (PDA) or the like.

Figure 1:
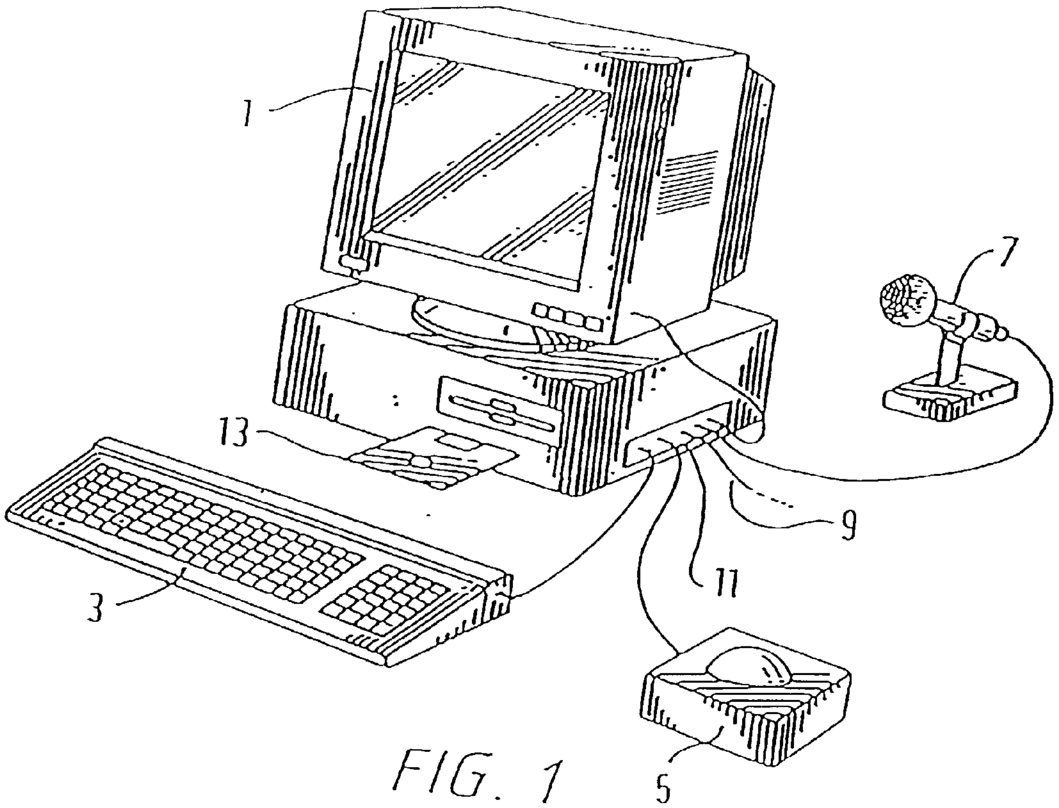
FIG. 1 is a schematic view of a computer which may be programmed to operate an embodiment of the present invention.

FIG. 1 shows a personal computer (PC) 1 which may be programmed to operate an embodiment of the present invention. A keyboard 3, a pointing device 5, a microphone 7 and a telephone line 9 are connected to the PC 1 via an interface 11. The keyboard 3 and pointing device 5 enable the system to be controlled by a user. The microphone 7 converts the acoustic speech signal of the user into an equivalent electrical signal and supplies this to the PC 1 for processing. An internal modem and speech receiving circuit (not shown) may be connected to the telephone line 9 so that the PC 1 can communicate with, for example, a remote computer or with a remote user.

The program instructions which make the PC 1 operate in accordance with the present invention may be supplied for use with an existing PC 1 on, for example a storage device such as a magnetic disc 13, or by downloading the software from the Internet (not shown) via the internal modem and the telephone line 9.

Figure 2:
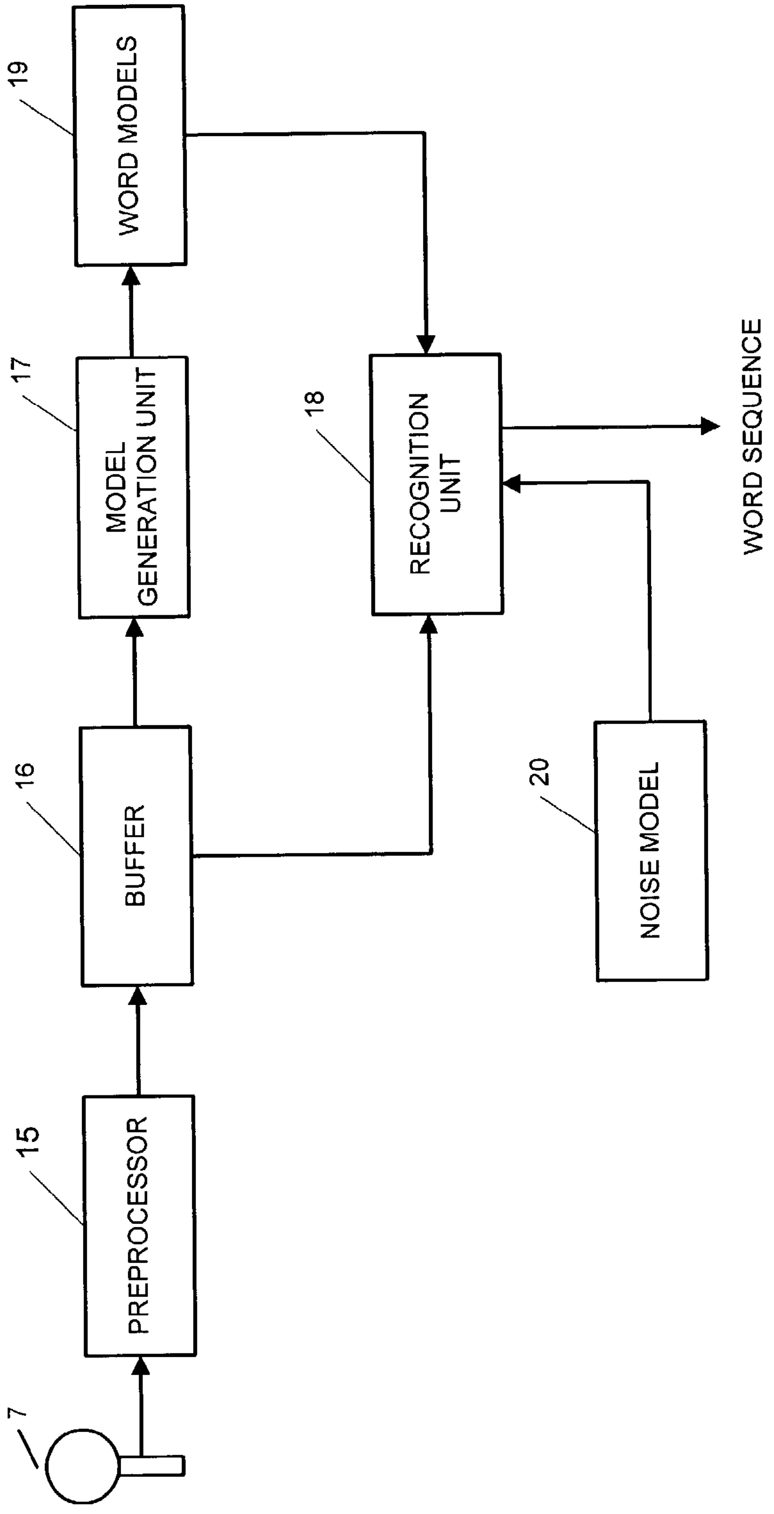
FIG. 2 is a schematic overview of a speech model generation system in accordance with an embodiment of the present invention.

The operation of the speech model generation system of this embodiment will now be briefly described with reference to FIG. 2.

Electrical signals representative of the input speech from, for example, the microphone 7 are applied to a preprocessor 15 which converts the input speech signal into a sequence of parameter frames, each representing a corresponding time frame of the input speech signal. The sequence of parameter frames are supplied, via buffer 16, to either a model generation unit 17 or a recognition unit 18.

More specifically, when the apparatus is generating models the parameter frames are passed to the model generation unit 17 which processes the frames and generates word models which are stored in a work model block 19. When the apparatus is recognising speech, the parameter frames are passed to the recognition unit 18, where the speech is recognised by comparing the input sequence of parameter frames with the word models stored in the word model block 19. A noise model 20 is also provided as an input to the recognition unit 18 to aid in the recognition process. A word sequence output from the recognition unit 18 may then be transcribed for use in, for example, a word processing package or can be used as operator commands to initiate, stop or modify the action of the PC 1.

In accordance with the present invention, as part of the processing of the model generation unit 17, the model generation unit 17 generates and stores as word models in the word model block 19 hidden Markov models representative of utterances detected by the microphone 7. Specifically, the model generation unit 17 processes utterances to generate hidden Markov models which model a number of states where the number of states is selected based upon an optimisation parameter. In accordance with this embodiment this optimisation parameter is calculated so as to enable the model generation unit 17 to determine the optimal number of states for modelling a particular word of phrase.

A more detailed explanation will now be given of some of the apparatus blocks described above.

Preprocessor

The preprocessor will now be described with reference to FIG. 3.

The functions of the preprocessor 15 are to extract the information required from the speech and to reduce the amount of data that has to be processed. There are many different types of information which can be extracted from the input signal. In this embodiment the preprocessor 15 is designed to extract "formant" related information. Formants are defined as being the resonant frequencies of the vocal tract of the user, which change as the shape of the vocal tract changes.

Figure 3:
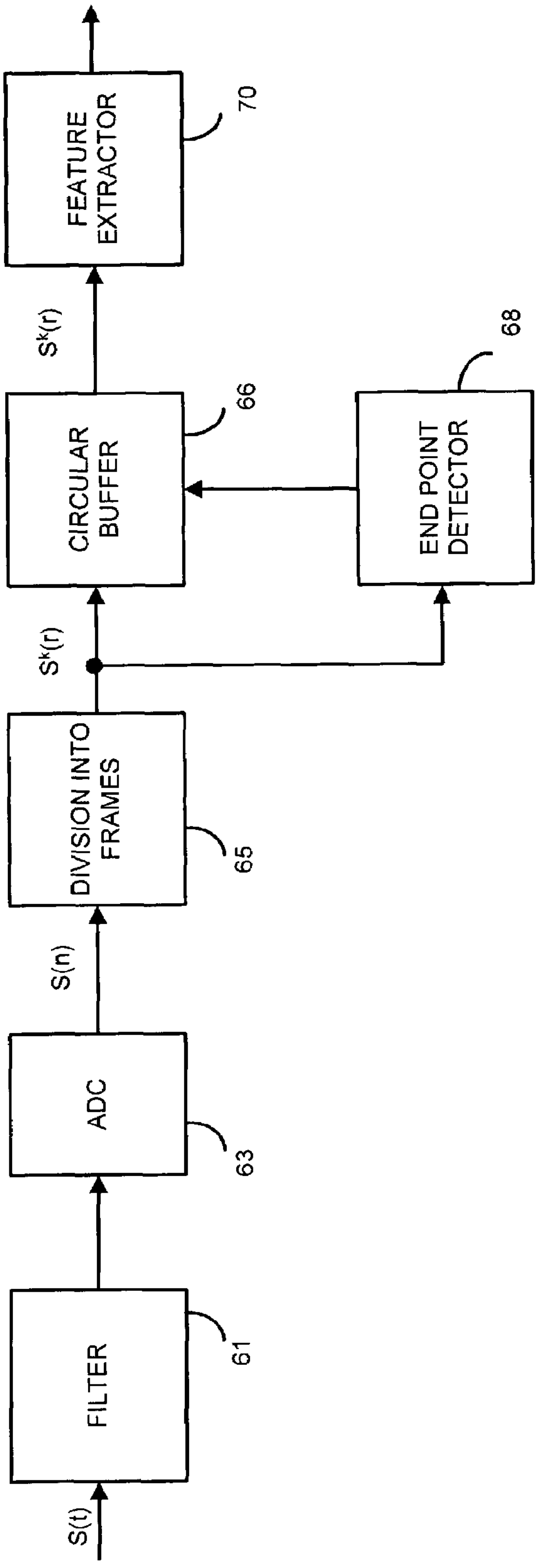
FIG. 3 is a block diagram of the preprocessor incorporated as part of the system shown in FIG. 2, which illustrates some of the processing steps that are performed on the input speech signal.

FIG. 3 shows a block diagram of some of the preprocessing that is performed on the input speech signal. Input speech S(t) from the microphone 7 or the telephone line 9 is supplied to filter block 61, which removes frequencies within the input speech signal that contain little meaningful information. Most of the information useful for speech recognition is contained in the frequency band between 300 Hz and 4 KHz. Therefore, filter block 61 removes all frequencies outside this frequency band. Since no information which is useful for speech recognition is filtered out by the filter block 61, there is no loss of recognition performance. Further, in some environments, for example in a motor vehicle, most of the background noise is below 300 Hz and the filter block 61 can result in an effective increase in signal-to-noise ratio of approximately 10 dB or more. The filtered speech signal is then converted into 16 bit digital samples by the analogue-to-digital converter (ADC) 63. To adhere to the Nyquist sampling criterion, the ADC 63 samples the filtered signal at a rate of 8000 times per second. In this embodiment, the whole input speech utterance is converted into digital samples and stored in a buffer (not shown), prior to the subsequent steps in the processing of the speech signals.

After the input speech has been sampled it is divided into non-overlapping equal length frames in block 65. The speech frames $S^k(r)$ output by the block 65 are then written into a circular buffer 66 which can store 62 frames corresponding to approximately one second of speech. The frames written in the circular buffer 66 are also passed to an endpoint detector 68 which processes the frames to identify when the speech in the input signal begins, and after it has begun, when it ends. Until speech is detected within the input signal, the frames in the circular buffer are not fed to the computationally intensive feature extractor 70. However, when the endpoint detector 68 detects the beginning of speech within the input signal, it signals the circular buffer to start passing the frames received after the start of speech point to the feature extractor 70 which then extracts a parameter frame vector $f_k$ comprising set of parameters for each frame representative of the speech signal within the frame. The parameter frame vectors $f_k$ are then stored in the buffer 16 (not shown in FIG. 3) prior to processing by the recognition block 17 or the model generation unit 18.

Model Generation Unit

Figure 4:
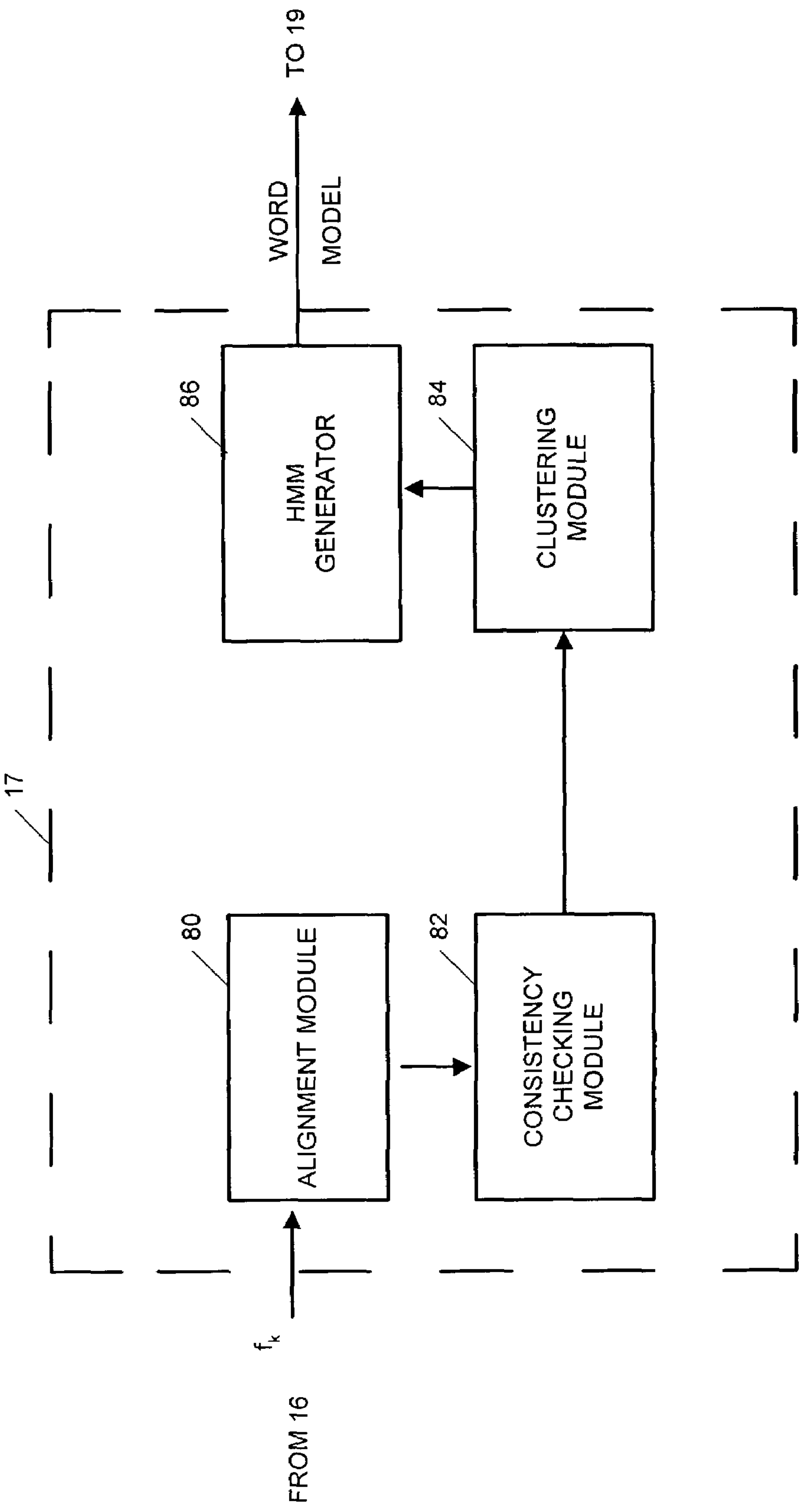
FIG. 4 is a block diagram of the model generation unit incorporated as part of the system shown in FIG. 2.

FIG. 4 is a schematic block diagram of a model generation unit 17 in accordance with the present invention.

In this embodiment the model generation unit 17 comprises alignment module 80 arranged to receive pairs of sequences of parameter frame vectors from the buffer 16 (not shown in FIG. 4) and to perform dynamic time warping of the parameters frame vectors so that the parameter frame vectors for corresponding parts of the pair of utterances are aligned; a consistency checking module 82 for determining whether aligned parameter frame vectors for a pair of utterances aligned by the alignment module 80 correspond to the same word or phrase; a clustering-module 84 for grouping parameter frame vectors aligned by the alignment module 50 into a number of clusters corresponding to the number of states in a hidden Markov model (HMM) that is to be generated for the utterance; and a hidden Markov model generator 86 for processing the grouped parameter frame vectors to generate a hidden Markov model which is output and stored in the word model block 19.

In this embodiment, the clustering of parameter frame vectors by the clustering model 84 is performed to minimise a calculated objective function which identifies when the number of clusters corresponds to the number of states for a hidden Markov model which best represents the utterances being processed. Throughout the determination of the clusters, this objective function is updated so that when the optimum number of states has been identified, the clustering module 84 can pass the clusters to the hidden Markov model generator 86 which utilises the clusters to generate a hidden Markov model having the identified number of states.

Figure 5:
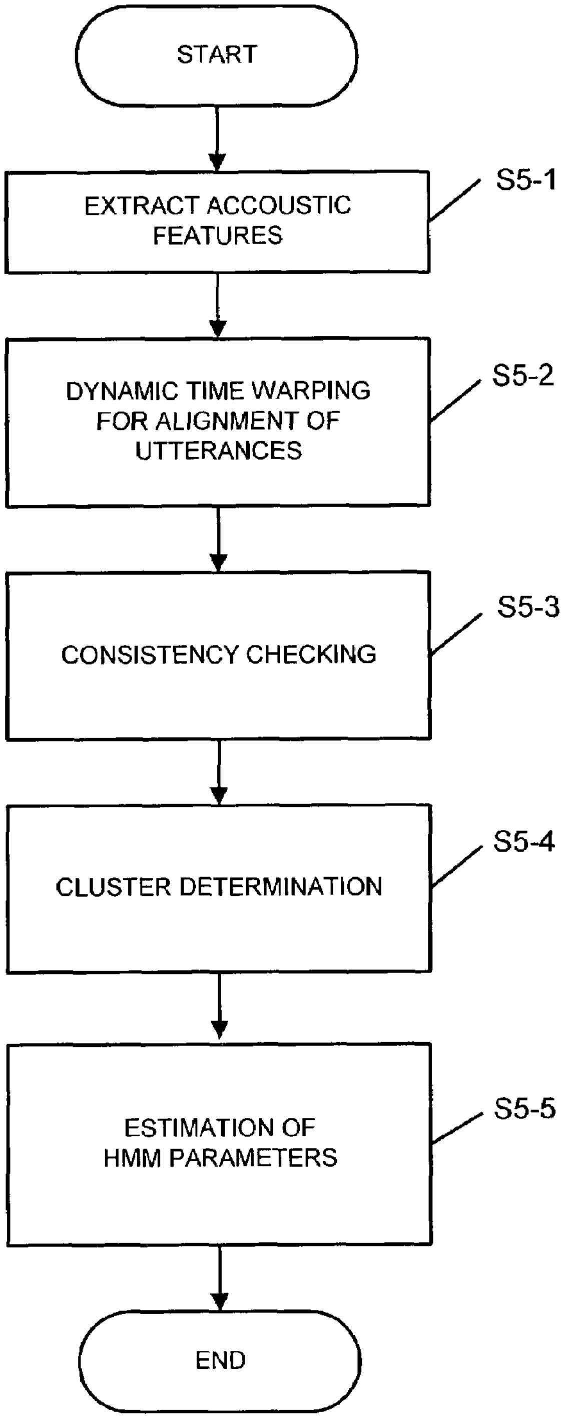
FIG. 5 is a flow diagram of the processing performed by the speech recognition system of FIG. 2 for generating a model of a word or phrase.

An overview of the processing of the model generating apparatus in accordance with this embodiment will now be described with reference to FIG. 5 which is a flow diagram of the processing of the apparatus.

Initially (S5-1) the pre-processor 15 extracts acoustic features from a pair of utterances detected by the microphone 7. A set of parameter frame vectors for each utterance is then passed via the buffer 16 to the model generation unit 17.

In this embodiment the parameter frame vectors for each frame comprise a vector having an energy value and a number of spectral frequency values together with time derivatives for the energy and spectral frequency values for the utterance. In this embodiment the total number of spectral feature values is 12 and time derivatives are determined for each of these spectral feature values and the energy values for the parameter frame. Thus as a result of processing by the pre-processor 15 the model generation unit 17 receives for each utterance a set of parameter frame vectors $f_k$ where each of the parameter frame vectors comprises a vector having 26 values (1 energy value, 12 spectral frequency values and time derivatives for the energy and spectral frequency values).

Alignment of Parameter Frames

When two sets of parameter frame vectors $f_k$ have been received by the model generation unit 17, they are processed (S5-2) by the alignment module 80.

More specifically the alignment module 80 processes the sets of parameter frame vectors $f_k$ using a dynamic time warping algorithm to remove from the sets of parameter frames vectors $f_k$ natural variations in timing that occur between utterances. In this embodiment this alignment of parameter frames is achieved utilising dynamic programming techniques such as are described in U.S. Pat. No. 6,240,389 which is hereby incorporated by reference.

An overview of the dynamic programming matching process performed by the alignment module 80 will now be given with reference to FIG. 6.

Figure 6:
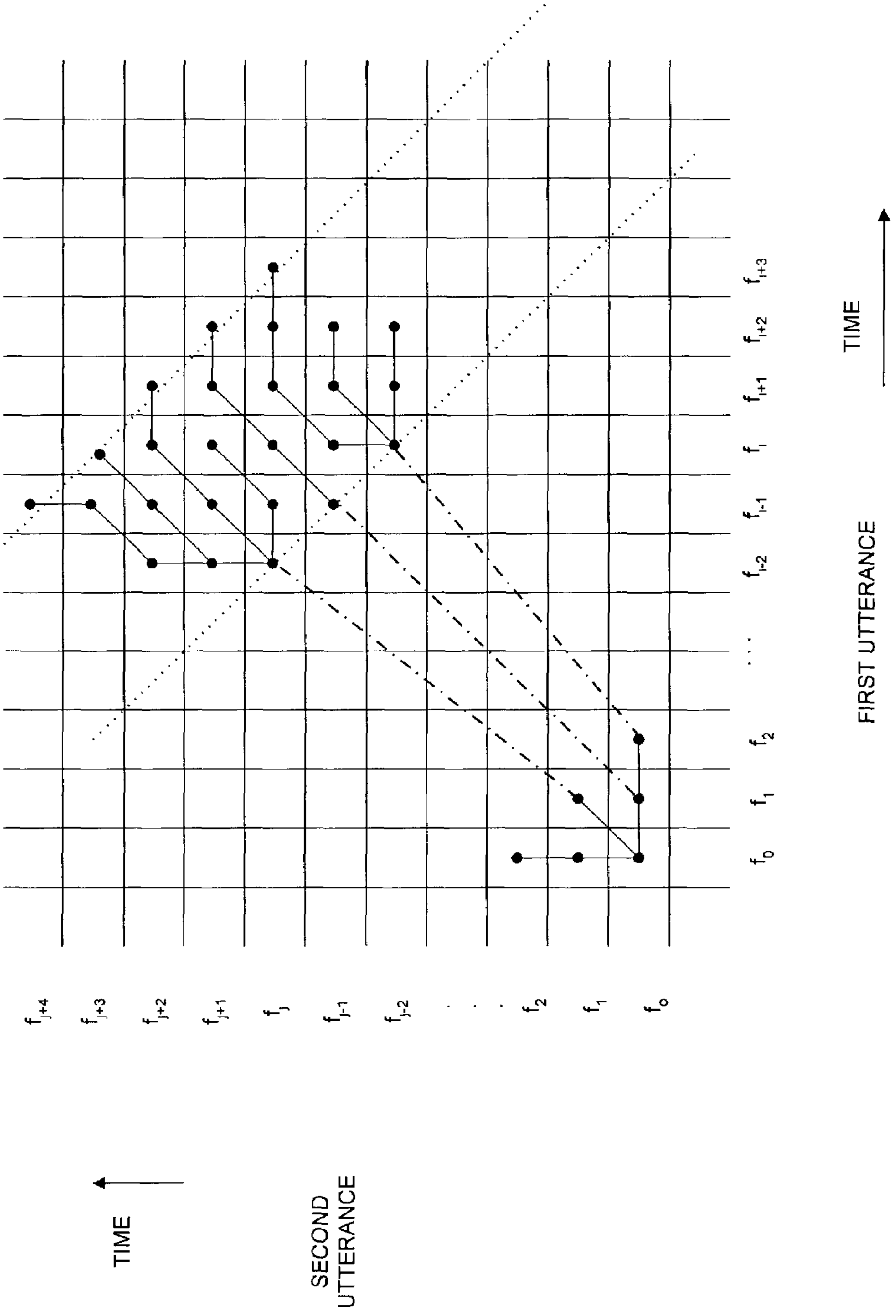
FIG. 6 is a schematic diagram of the matching of parameter frames of a pair of utterances to account for variation in timing between utterances.

FIG. 6 shows along the abscissa a sequence of parameter frame vectors representative of a first input utterance and along the ordinate a sequence of parameter frame vectors representative of a second input utterance. In this embodiment, the alignment module 80 proceeds to determine for the matrix illustrated by FIG. 6 a path from the bottom left corner of the matrix to the top right corner which is associated with a cumulative score indicating the best matches between parameter frame vectors of the pairs of utterances identified by the co-ordinates of the path.

More specifically the alignment module 80 calculates a cumulative score for a path using a local vector distance measure $\Delta_{i,j}$, for comparing parameter frame vector i of the first utterance and parameter frame vector j of the second utterance. In this embodiment the local vector distance measure is:

$$\Delta_{i,j}=\Sigma^{k}_{n=1}|u_{i,n}-v_{j,n}|$$

where $u_{i,n}$ is parameter frame vector i of the first utterance and $v_{j,n}$ is parameter frame vector j of the second utterance.

In order to find the best alignment between the first and second utterances, it is necessary to find the sum of all the differences between all distances between all the pairs of frames along the path identifying an alignment between the utterances. This definition will ensure that corresponding parameter frames of the two utterances are properly aligned with one another. One way of calculating this best alignment is to consider all possible paths and to add the distance value $\Delta_{i,j}$ (the distance between parameter frame i and parameter frame j) of the first and second utterance for each point along each path. Although this enables an optimum path to be determined, the number of paths to be considered rapidly becomes very large so that computation is impossible for any practical speech recognition system.

Dynamic programming is a mathematical technique which finds the cumulative the distance along an optimum path without having to calculate the distance along all possible paths. The number of paths along which cumulative distance is determined is reduced by placing certain constraints on the dynamic programming process.

Thus, for example, it can be assumed that the optimum path will always go forward for a non-negative slope, otherwise one of utterances will be a time reversed version of the other. Another constraint which can be placed on the dynamic programming process is to limit the amount of time compression/expansion of the input word relative to the reference word. This constraint can be realised by limiting the number of frames that could be skipped or repeated in a matching process. Further, the number of paths to be considered can be reduced by utilising a pruning algorithm to reject continuations of paths having a cumulative distance score greater than a threshold percentage of the current best path.

In this embodiment a path for aligning a pair of utterances is determined by initially calculating distance value for a match between parameter frame vectors 0 for the first and second utterance. The possible paths from point (0,0) to points (0,1) and (1,0) are then calculated. In this case the only paths will be (0,0)→(1,0) and (0,0)→(0,1). Cumulative scores $S_{1,0}$ and $S_{0,1}$ for these points are then set to be equal to $\Delta_{0,0}$ and stored.

The next diagonal comprising points (0,2), (1,1) and (2,0) is then considered. For each point, the points immediately to the left, below and diagonally to the left and below are identified. The best path for each point is then determined by determining the least values of the following where a value for $S_{i-1,j}$ $S_{i,j-1}$ or $S_{i-1,j-1}$ has been stored.

$$S_{i-1}+\Delta_{i-l,j}$$

$$S_{i,j-1}+\Delta_{i,j-1}$$

$$S_{1-1,j-1}+2\Delta_{i-1,j-1}$$

A cumulative path score for each point and data identifying the previous point in the path point used to generate the path score for subsequent point is then stored.

The points for the subsequent diagonals are then considered in turn and in a similar way for each point a cumulative distance score $S_{i,j}$ is calculated where $S_{i,j}$ is set equal to:

$$S_{i,j}=\min(S_{i-1,j}\Delta_{i-1,j},S_{i,j}\Delta_{i,j-1},S_{i-1,j-1}+2\Delta_{i-1,j-1})$$

The path to the new point associated with the least score is then determined and data identifying previous step in the path that is stored.

When values for all points on a diagonal have been calculated the number of points under consideration is then pruned to remove points from consideration having distance cumulative distance scores greater than a preset threshold above the best path score or which indicate excessive time warping. The values for the next diagonal are then determined.

Thus in this way as is illustrated by FIG. 6 a series of paths are propagated from point (0,0). Eventually as a result of this iterative processing the final two frames in the utterances will be reached. The best path from point (0,0) to the point corresponding to the end of the two utterances can then be determined utilising the stored data. The alignment of the parameter frame vectors of the first and second utterances defined by this best path is then passed together with the distance scores for the points on the path to the consistency checking module 82.

Consistency Checking

After an alignment of the utterances has been determined the consistency checking module 82 then (S5-3) utilises the calculated alignment path and the distance values for the parameter frames matched by the alignment module 80 to determine whether the two utterances for which parameter frames have been determined correspond to the same word or phrase (S5-3).

The consistency check performed in this embodiment, is designed to spot inconsistencies between the example utterances which might arise for a number of reasons. For example, when the user is inputting a training example, he might accidentally breathe heavily into the microphone at the beginning of the training example. Alternatively, the user may simply input the wrong word. Another possibility is that the user inputs only part of the training word or, for some reason, part of the word is cut off. Finally, during the input of the training example, a large increase in the background noise might be experienced which would corrupt the training example. The present embodiment checks to see if the two training examples are found to be consistent, and if they are, then they are used to generate a model for the word being trained. If they are inconsistent, then a request for new utterance is generated.

More specifically, once the alignment path has been found the average score for the whole path is then determined. This average value is the cumulative distance score $S_{i,j}$ for the final point on the path divided by the sum of the number of parameter frame vectors representing the first and second utterances. This average score is a measure of the overall consistency of the two utterances.

A second consistency value is then determined. In this embodiment this second value is determined as the largest increase in the cumulative score along the alignment path for a set of parameter frame vectors for a section of an utterance corresponding to a window which in this embodiment is set to 200 milliseconds. This second measurement is sensitive to differences at smaller time scales.

The average score and this greatest increase in cumulative score for a preset window are then compared with a bivariate model previously trained with utterances known to be consistent. If the values determined for the pair of utterances correspond to a portion of the bivarate model indicating a 95% or greater probability that the utterances are consistent, the utterances are deemed to represent the same word or phrase. If this is not the case the utterances are rejected and a request for new utterances is generated.

At this stage, the model generation unit 17 will have determined an alignment for the parameter frame vectors of the utterances and will have determined that the parameter frame vectors correspond to similar utterances so that a word model for the pair of references can be generated. The alignment path and parameter frame vectors are then passed to the clustering module 84 which proceeds to group (S5-4) the parameter frame vectors into a number of clusters.

Cluster Generation

Figure 7:
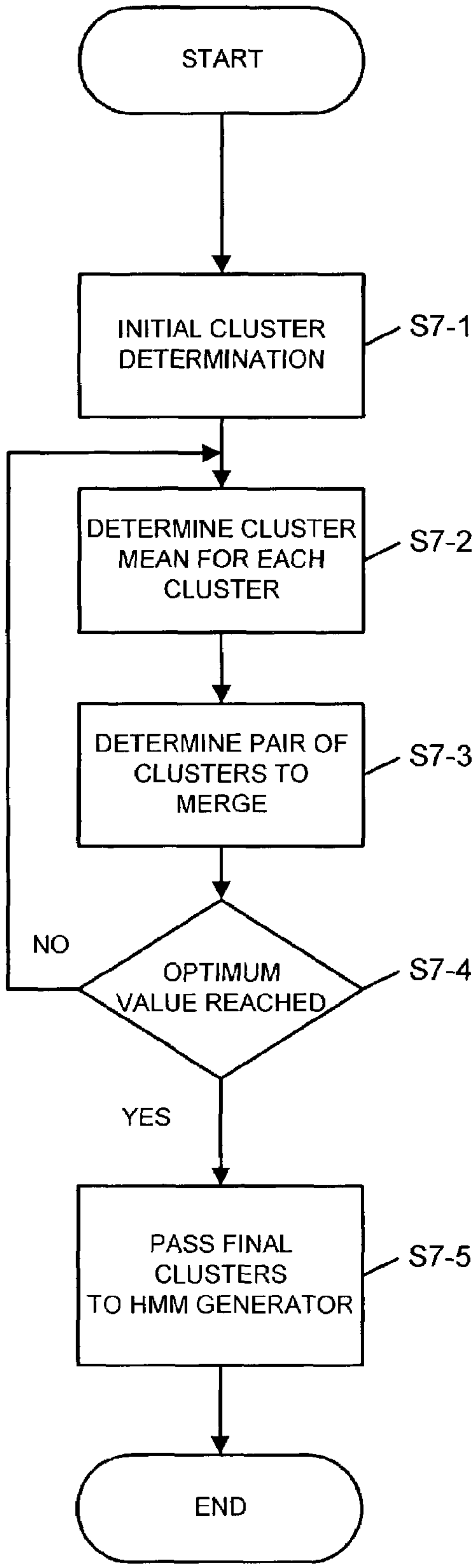
FIG. 7 is a flow diagram of the processing performed by the clustering module of the model generation unit of FIG. 4.

FIG. 7 is a flow diagram of the processing performed by the clustering module 84.

Initially (S7-1) the clustering module 84 determines an initial set of clusters utilising the alignment path determined by the alignment module 80.

Specifically the clustering module 84 generates a set of clusters where the frames remain in their original time order and each cluster contains at least one frame from each of the utterances.

In this embodiment this is achieved by considering each of the points on the alignment path in turn. For the initial point (0,0) a first cluster comprising the parameter frame vectors for the first frame $f_o$ of the first utterance and the parameter frame vector for the first frame, $f_o$ of the second utterance is formed.

The next point on the alignment path is then considered. This point will either be point (0,1), point (1,1) or point (0,1). If the second point in the path is point (1,0) the parameter frame vector for $f_1$ in the first utterance is added to the first cluster and the next point on the path is considered. If the second point in the path is point (0,1) the parameter frame vector for $f_1$ in the second utterance is added to the first cluster and the next point in the path is considered.

Eventually a point in the path will be reached (i,j) with i>0 and j>0. The co-ordinates (i,j) of this point are then stored and the parameter frame vector $f_i$ from the first utterance and the parameter frame vector $f_j$ from the second utterance are added to a new cluster.

Subsequent points in the path are considered in turn. Where the co-ordinates of the next point in path are such that the point identifies co-ordinates (k,l) with k=i the parameter frame vector $f_1$ from the second utterance is added to the current cluster. Where the co-ordinates of the next point are (k,l) with l=j the parameter frame vector $f_k$ from the first utterance is added to the current cluster.

Eventually a point on the path will be reached having co-ordinates (k,l) with k>i and l>j at which point a new cluster is started.

This processing is repeated for each point in the alignment path until the final point in the path is reached.

The initial clustering performed by the clustering module 84 as described above produces a large number of clusters each containing a small number of parameter frame vectors where at least one parameter frame vector from each utterance is included in each cluster. This initial large number of clusters is then reduced (S-7-2-S7-4) by merging clusters as will now be described.

Specifically after the initial clusters have been determined, a mean vector for the parameter frame vectors in each cluster is determined. Specifically, the average vector for parameter frame vectors included in each cluster is determined as:

$$\mu_{ck} = \frac{1}{N_c}\sum_{l=1}^{Nc} X_{l,k}$$

where $\mu_{ck}$ is the vector comprising the average values for each of the values including the parameter frame vectors in the cluster and $N_c$ the number of frames in that cluster and $X_{l,k}$ is the $l_{th}$ parameter vector in the cluster.

When a mean vector for each cluster has been determined, the clustering module 84 then (S7-3) selects a pair of clusters to be merged.

Specifically, for each of the pairs of clusters containing parameter vectors for adjacent portions of utterances the following value is determined:

$$\frac{N_A N_B}{N_A + N_B} \sum_K (\mu_{Ak} - \mu_{Bk})^2$$

where $N_A$ the number of parameter frame vectors included in cluster A, $N_B$ is the number of parameter frame vectors included in cluster B and $\mu_{Ak}$ and $\mu_{Bk}$ are the calculated mean vectors for cluster A and cluster B respectively.

The pair of adjacent clusters for which the smallest value is determined are then replaced by a single cluster containing all of the parameter frame vectors from the two clusters which are selected for merger. Selecting the clusters for merger in this way causes the parameter frame vectors to be assigned to the new clusters so that the differences between the parameter frame vectors in the new cluster and the mean vector for the new cluster is minimised whilst the parameter frames remain in time order.

After a selected pair of clusters have been merged, the clustering module 84 then determines a value for the following objective function:

$$O = \frac{\sum_c \left[ \sum_{l=1}^{N} \sum_k (X_{lk} - \mu_{Ck})^2 \right]}{(N_T - n_c)N}$$

where $N_T$ is the total number of parameter frame vectors for the two utterances, $n_c$ is the current number of clusters N is the number of values in each parameter frame vector and $X_{l,k}$ and $\mu_{C,k}$ are the parameter frame vectors and average parameter frame vectors in the clusters.

Considering only the single value of the parameter frame vectors the conventional $X^2$ test for goodness of fit for a Gausian model for the variation of that value would be equal to:

$$\frac{1}{\sigma_c^2} \left[ \sum_{l=1}^{N} \sum_K (X - \mu_c)^2 \right]$$

where X is the value for the parameter in each of the parameter frame vectors included in a cluster and $\mu_c$ and $\sigma_c$ are the mean and variance of the gausian model being considered.

If it is assumed that $\sigma_c$ is equal for each of the values of the parameter frame vectors then $X^2$ per degrees freedom for a model would be equal to:

$$\frac{\sum_c \left[ \sum_{l=1}^{N} \sum_K (X_{l,k} - \mu_{ck})^2 \right]}{\sigma_c^2 (N_T - n_c)N}$$

As a test for a good fit of a model is that $X^2$ per degrees of freedom (that is the difference between the number of data points being modelled and the number of parameters used to model that data) for the model is approximately equal to 1 it will be apparent that the above described objective function will indicate that a model is a good fit when the objective function is equal to $\sigma_c^2$.

Figure 8:
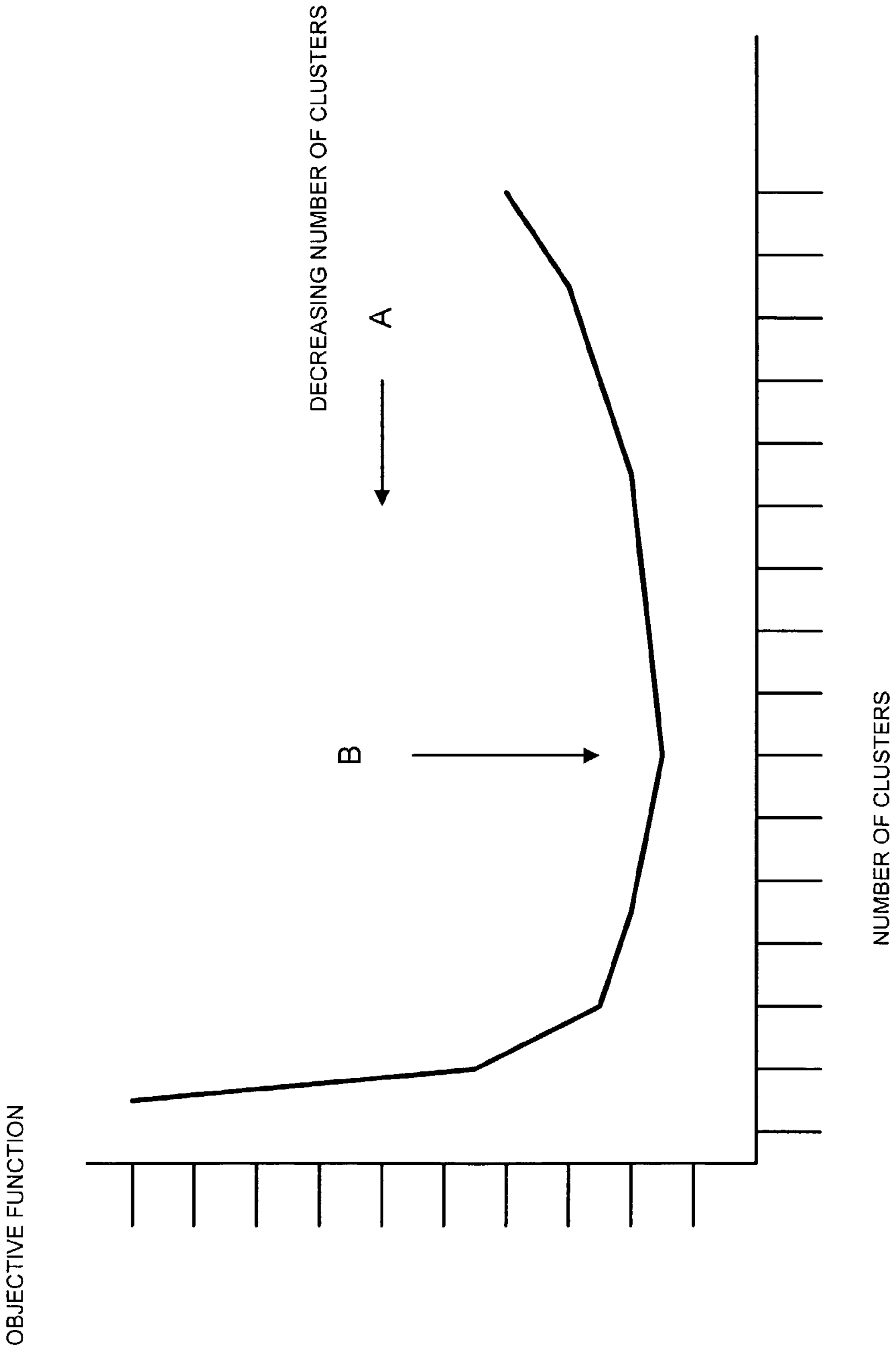
FIG. 8 is an illustrative graph of the variation of an objective function with the number of states in a a model to be generated.

It has been determined by the applicants that the value of the above objective function for a set of clusters varies for a set of parameters frame vectors in the manner illustrated in FIG. 8.

Specifically, referring to FIG. 8 which is a graph of the value of the above objective function for an exemplary model against the number of clusters in a model it can be seen as the number of clusters reduces in the direction indicated by arrow A in the Figure the objective function also decreases until a minimum value is reached at the point indicated by arrow B. At this point the objective function will be approximately equal to $\sigma_c^2$.

It is therefore possible for the clustering module 84 to determine that an optimal fit per degrees of freedom for the parameter frame vectors will be with a Gausian model having fixed σ values with a model having states corresponding to the identified number of clusters.

Thus in this embodiment returning to FIG. 7, at each iteration after a pair of clusters have been merged the objective function is determined by the cluster module 84 and compared (S7-4) with the objective function resulting from processing the previous iteration.

If the objective function for the previous iteration is greater than the objective function determined for the current iteration the clustering module 84 then proceeds to merge a further pair of clusters in the manner as previously described (S7-2-S7-3) before determining an objective function value for the next iteration (S7-4).

Eventually as is indicated by the graph of FIG. 8, a minimum value will be reached. At this point the number of clusters will identify an optimum number of states for modelling the parameter frame vectors. At this point the calculated clusters are passed by the clustering module 34 to the HMM generator 36 (S7-5).

Model Generation

Returning to FIG. 5 after a final clustering of parameter frame vectors has been determined by the clustering module 84 the HMM generator 86 then (S5-5) utilises the received clusters to generate a hidden Markov model representative of the received utterances.

Specifically in this embodiment, each of the clusters is utilised to determine a probability density function comprising a mean vector being the mean vector for the cluster and a variance which in this embodiment is set a fixed value for all of the states to be generated in the hidden Markov model.

Transition probabilities between successive states in the model represented by the clusters are then determined.

In this embodiment this is achieved by for each cluster determining the total number of parameter frames in each cluster. The probability of self-transition is then set using the following equation:

$$\frac{\text{No frames in cluster} - \text{number of training utterances}}{\text{No frames in cluster}}$$

The transition probability for one state represented by a cluster to the next state represented by a subsequent cluster is then set to be equal to one minus the calculated self transition probability for the state.

The generated hidden Markov model is then output by HMM generator 86 and stored in the word model block 19.

When the speech recognition system is utilised to recognise words the recognition block 18 then utilises the generated Markov models stored in the word model block 19 in a conventional manner to identify which words or phrases detected utterences most closely correspond to and to output a word sequence identify those words and phrases.

FURTHER MODIFICATIONS AND EMBODIMENTS

A number of modifications can be made to the above speech recognition system without departing from the inventive concepts of the present invention. A number of these modifications will now be described.

Although reference has been made in the above embodiment to hidden Markov models having transition parameters, it will be appreciated that the present invention is equally applicable to hidden Markov models known as templates which do not have any transition parameters. In the present application the term hidden Markov models should therefore be taken to include templates.

Although in the previous embodiment a model generation system has been described which utilises a pair of utterances to generate models, it would be appreciated that models could be generated utilising a single representative utterance of a word or phrase or using three or more representative utterances.

In the case of a system in which a model is generated from a single utterance, it will be appreciated that the alignment and the consistency checking described in the above embodiment would not be required. In such a system when a set of parameter frame vectors for the utterance has been determined, an initial set of clusters each comprising a single parameter frame vector could then be generated by the clustering module 84. These initial clusters could then be merged in the same way as has previously been described above to generate an optimum number of clusters for generating a hidden Markov model representing the utterance.

In the case of a model generation system, arranged to process three or more utterances, the parameter frames for the utterances would need to be aligned. This could either be achieved using a three or higher dimensional path determined by an alignment module 80 in a similar way as that previously described or alternatively a particular utterance could be selected and the alignment of the remaining utterance could be made relative to this selected utterance.

It will be appreciated that although one example of the algorithm generating initial clusters has been described which utilises a determined alignment path, the precise algorithm described is not critical to the present invention and a number of variations are possible. Thus, for example, in an alternative embodiments the alignment path could be utilised to determine an initial ordering of the parameter frames and an initial clustering comprising a single frame per cluster ordered in the calculated order could be made.

It will be appreciated that the objective function described in the above embodiment is an objective function suitable for generating acoustic models using gausian probability density functions with fixed $\sigma$. If, for example, each of the states had different $\sigma$ parameters, it would be appropriate to cluster each cluster also using a $\sigma$ parameter. In such an embodiment it would also be necessary to change in the objective function to take into account the $\sigma$ parameters and the extra parameters would need to be included when determining the additional degrees of freedom used in the clustering determination criterion.

Although in the above embodiment a hidden Markov model is being described as being generated directly using calculated mean vectors from clusters, it will be appreciated that other methods could be used to generate the hidden Markov model for an utterance.

More specifically, after generating an initial model in the manner described, the initial model could be revised using conventional methods such as the Baum Welch algorithm. Alternatively, after determining the number of required states in the manner described above a model could be generated using only the Baum Welch algorithm or any other conventional technique which requires the number of states of a model to be generated to be known in advance.

In the above embodiment generation of models having a number of states which result in the minimisation of an objective function is described. It will be appreciated that where models are generated from a limited number of utterances, it is possible that the generated models will not be entirely representative of all utterances of a word or phrase they are meant to represent.

In particular, where a model is generated from a limited number of utterances, there is a tendency for the generated models to over represent the training utterances. In alternative embodiments of the present invention instead of generating a model utilising the number of states which minimises an objective function, the minimisation of an objective function could be utilised to select a different number of states to be used for a generated model.

More specifically, in order to generate a more compact model the total number of states could be selected to be fewer than the number of states which minimises the objective function. Such a selection could be made by selecting the number of states associated with a value for the objective function which is no more than a pre-set threshold, for example, 5-10% (above the least value for the objective function).

Although in the above embodiment a clustering algorithm has been described which generates groups of parameters by merging smaller groups, other systems could be used. Thus, for example, instead of merging clusters individual parameter frame vectors frames could be transferred between groups. Alternatively, instead of merging clusters an algorithm could be provided in which initially all parameter frame vectors were included in a single cluster and the single cluster was then broken up to increase the number of clusters and hence the number of states for a final generated model.

Although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source or object code or in any other form suitable for use in the implementation of the processes according to the invention. The carrier be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means.

When a program is embodied in a signal which may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

The invention claimed is:

1. A speech model generation apparatus for generating hidden Markov models representative of received speech signals, the apparatus comprising:

a receiver operable to receive speech signals;

a signal processor operable to determine for a speech signal received by said receiver, a sequence of feature vectors, each feature vector comprising one or more values indicative of one or more measurements of a said received speech signal;

a clustering unit operable to group feature vectors determined by said signal processor into a number of groups;

a selection unit operable to determine for a grouping of feature vectors generated by said clustering unit a matching value comprising a value indicative of the goodness of fit between said feature vectors and a hidden Markov model having states corresponding to each group of feature vectors divided by the difference between the total number of values in said feature vectors and the total number of variables defining density probability functions for said hidden Markov model, wherein said selection unit is operable to select said number of states for a speech model to be generated utilizing the matching values determined for groupings of feature vectors; and a model generator responsive to said selection unit to generate a speech model comprising a hidden Markov model having the number of states selected by said selection unit, each of said states being associated with a probability density function, said probability density function being determined utilizing the feature vectors grouped by said clustering unit.

2. Apparatus in accordance with claim 1, wherein said selection unit is operable to select as the number of states for a speech model to be generated, the number of groups of feature vectors of a grouping of feature vectors determined to have the least matching value.

3. Apparatus in accordance with claim 1, wherein said selection unit is operable to select as the number of states for a speech model to be generated, the number of groups of grouping of feature vectors having the least number of groups where the matching value for said grouping exceeds the least matching values for groupings determined by said clustering unit by less than a threshold.

4. Apparatus in accordance with claim 3, wherein said selection unit is operable to set said threshold as a function of the least matching value determined for a grouping of feature vectors by said clustering unit.

5. Apparatus in accordance with claim 1, wherein said clustering unit comprises:

an initial clustering module operable to generate an initial grouping of feature vectors; and a group modifying module operable to vary groupings of feature vectors.

6. Apparatus in accordance with claim 5, wherein said initial grouping module is operable to generate an initial grouping of feature vectors by generating a grouping wherein each group comprises a single feature vector.

7. Apparatus in accordance with claim 5, wherein said initial grouping module is operable to generate an initial grouping of feature vectors wherein said feature vectors comprise feature vectors from a plurality of signals, and each group of feature vectors includes feature vectors generated from each of said signals, each group of feature vectors comprising feature vectors representative of corresponding portions of said signals.

8. Apparatus in accordance with claim 5, wherein said group modifying module is operable to determine for pairs of groups of feature vectors comprising feature vectors representative of consecutive portions of a signal, a value indicative of the variation of said value indicative of the goodness of fit between said feature vectors to a hidden Markov model having states corresponding to said groups and a hidden Markov mode having a single state corresponding to said pair of groups wherein said group modifying module is operable to modify the grouping of vectors by merging groups of feature vectors representative of adjacent portions of signals which vary said value indicative of the goodness of fit by the smallest amount.

9. Apparatus in accordance with claim 1, wherein said model generator is operable to determine probability density functions for said selected number of states by determining for each group of a grouping of feature vectors having groups corresponding to said selected number of states, the average feature vectors of each of said groups.

10. Apparatus in accordance with claim 1, further comprising:

a model store confignred to store speech models generated by said model generator; and a speech recognition unit operable to receive signals and utilize speech models stored in said model store to determine which of said stored models corresponds to a received speech signal.

11. A hidden Markov model generation apparatus for generating hidden Markov models representative of received signals, the apparatus comprising:

a receiver operable to receive signals;

a signal processor operable to determine for a signal received by said receiver, a sequence of feature vectors, each feature vector comprising one or more values indicative of one or more measurements of a said received signal;

a clustering unit operable to group feature vectors determined by said signal processor into a number of groups;

a selection unit operable to determine for a grouping of feature vectors generated by said clustering unit, a matching value comprising a value indicative of the goodness of fit between said feature vectors and a hidden Markov model having states corresponding to each group of feature vectors divided by the difference between the total number of values in said feature vectors and the total number of variables defining density probability functions for said hidden Markov model, wherein said selection unit is operable to select a number of states for a speech model to be generated utilizing the matching values determined for groupings of feature vectors; and a model generator responsive to said selection unit to generate a hidden Markov model comprising the number of states selected by said selection unit, each of said states being associated with a probability density function, said probability density functions being determined utilizing the feature vectors grouped by said clustering unit.

12. A method of generating hidden Markov models representative of received speech signals to be used in recognizing speech, comprising the steps of:

receiving speech signals;

determining for a received speech signal, a sequence of feature vectors, each feature vector comprising one or more values indicative of one or more measurements of said received speech signal;

grouping feature vectors determined for received signals into a number of groups;

determining for a generated grouping of feature vectors, a matching value comprising a value indicative of the goodness of fit between said feature vectors and a hidden Markov model having states corresponding to each group of feature vectors divided by the difference between the total number of values in said feature vectors and the total number of variables defining density probability functions for said hidden Markov model;

selecting a number of states for a speech model to be generated utilizing the matching values determined for said generated groupings of feature vectors; and generating a speech model comprising a hidden Markov model having said selected the number of states utilizing said determined feature vectors.

13. A method in accordance with claim 12, wherein said selecting said number of states comprises selecting as the number of states for a speech model to be generated, a number corresponding to the number of groups of feature vectors of a grouping of feature vectors associated with a least matching value.

14. A method in accordance with claim 13, wherein said selecting said number of states comprises selecting as the number of states for a speech model to be generated a number corresponding to the number of groups of a grouping of feature vectors having the least number of groups where the matching value associated with said grouping exceeds the least matching values determined for a group of said feature vectors by less than a threshold.

15. A method in accordance with claim 14, wherein said selecting said number of states further comprises setting said threshold as a function of the least matching value determined for a grouping of said feature vectors.

16. A method in accordance with claim 12, wherein said grouping step comprises the steps of:

generating an initial grouping of feature vectors; and varying said generated groupings of feature vectors.

17. A method in accordance with claim 16, wherein said initial grouping comprises a grouping wherein each group comprises a single feature vector.

18. A method in accordance with claim 16, wherein said feature vectors comprise feature vectors determined from a plurality of signals and said initial grouping is such that each group of feature vectors includes feature vectors determined from each of said signals, each group of feature vectors comprising feature vectors representative of determined corresponding portions of said signals.

19. A method in accordance with claim 16, wherein varying said generated groupings comprises:

determining for pairs of groups of feature vectors comprising feature vectors representative of consecutive portions of a signal, a value indicative of the variation of said value indicative of the goodness of fit between said feature vectors to a hidden Markov model having states corresponding to said groups and a hidden Markov model having a single state corresponding to said pair of groups; and modifying the grouping of feature vectors by merging groups of feature vectors representative of adjacent portions of signals which vary said value indicative of the goodness of fit by the smallest amount.

20. A method in accordance with claim 12, wherein said model generation step comprises generating probability density functions for said selected number of states by determining for each group of a grouping of feature vectors having groups corresponding to said selected number of states, the average feature vectors of each of said groups.

21. A method in accordance with claim 12, further comprising the steps of:

storing speech models generated by said model generator;

receiving further signals; and utilizing said stored speech models to determine which of said stored models corresponds to a received further signal.

22. A computer-readable storage medium storing computer implementable code for causing a programmable computer to perform a method in accordance with claim 12.

23. A computer-readable storage medium in accordance with claim 22, comprising a computer disc.

24. A computer disc in accordance with claim 23, wherein said computer disc is an optical, magneto-optical or magnetic disc.

25. A method of generating hidden Markov models representative of received signals, comprising the steps of:

receiving signals;

determining for received signals a sequence of feature vectors, each feature vector comprising one or more values indicative of one or more measurements of said received signal;

grouping feature vectors into a number of groups;

determining for a generated grouping of feature vectors, a matching value comprising a value indicative of the goodness of fit between said feature vectors and a hidden Markov model having states corresponding to each group of feature vectors divided by the difference between the total number of values in said feature vectors and the total number of variables defining density probability functions for said hidden Markov model;

selecting a number of states for a speech model to be generated utilizing the matching values determined for said generated groupings of feature vectors; and generating a hidden Markov model comprising said selected number of states.

26. A computer-readable storage medium storing computer implementable code for causing a programmable computer to perform a method of generating hidden Markov models representative of received signals, said code including:

code for receiving signals;

code for determining for the received signals a sequence of feature vectors, each feature vector comprising one or more values indicative of one or more measurements of said received signal;

code for grouping feature vectors into a number of groups;

code for determining for a generated grouping of feature vectors, a matching value comprising a value indicative of the goodness of fit between said feature vectors and a hidden Markov model having states corresponding to each group of feature vectors divided by the difference between the total number of values in said feature vectors and the total number of variables defining density probability functions for said hidden Markov model;

code for selecting a number of states for a speech model to be generated utilizing the matching values determined for said generated groupings of feature vectors; and code for generating a hidden Markov model comprising said selected number of states.

* * * * *

UNITED STATES PATENT AND TRADEMARK OFFICE

CERTIFICATE OF CORRECTION

PATENT NO. : 7,260,532 B2
APPLICATION NO. : 10/288517
DATED : August 21, 2007
INVENTOR(S) : Rees et al.

It is certified that error appears in the above-identified patent and that said Letters Patent is hereby corrected as shown below:

ON THE COVER PAGE
At (75) INVENTOR:
"David Llewellyn Rees, Berkshire (GB)" should read
--David Llewellyn Rees, Bracknell (GB)--.

IN THE DRAWINGS:
Figure 5, "ACCOUSTIC" should read --ACOUSTIC--.

COLUMN 1:
Line 55, "then expected." should read --than expected.--.
Line 58, "a word" should read --word--.

COLUMN 2:
Line 50, "in a a model" should read --in a model--.

COLUMN 4:
Line 35, "comprising set" should read --comprising a set--.
Line 48, "parameters" should read --parameter--.
Line 53, "clustering-module" should read --clustering module--.

COLUMN 6:
Line 12, "the distance" should read --distance--.
Line 19, "one of utterances" should read --one of the utterances--.
Line 33, "utterance." should read --utterances.--.
Line 52, "subsequent point" should read --subsequent points--.
Line 60, "that is stored." should read --is stored.--.

COLUMN 7:
Line 20, "embodiment," should read --embodiment--.
Line 54, "bivarate" should read --bivariate--.

COLUMN 8:
Line 15, "frame," should read --frame--.
Line 19, "(0,1)." should read --(1,0).--.
Line 48, "(S-7-2-S7-4)" should read --(S7-2 through S7-4)--.

COLUMN 9:
Line 10, "$N_A$ the" should read --$N_A$ is the--.
Line 35, "clusters" should read --clusters,--.
Line 41, "Gausian" should read --Gaussian--.
Line 51, "gausian" should read --Gaussian--.

UNITED STATES PATENT AND TRADEMARK OFFICE
CERTIFICATE OF CORRECTION

PATENT NO. : 7,260,532 B2
APPLICATION NO. : 10/288517
DATED : August 21, 2007
INVENTOR(S) : Rees et al.

It is certified that error appears in the above-identified patent and that said Letters Patent is hereby corrected as shown below:

<u>COLUMN 10</u>:
Line 6, "parameters" should read --parameter--.
Line 18, "Gausian" should read --Gaussian--.
Line 30, "(S7-2-S7-3)" should read --(S7-2 and S7-3)--.
Line 48, "is set a" should read --is set at a--.
Line 52, "for each cluster" should be deleted.

<u>COLUMN 11</u>:
Line 5, "utterences" should read --utterances--.
Line 6, "identify" should read --identifying--.
Line 53, "embodiments" should read --embodiment--.
Line 59, "gausian" should read --Gaussian--.

<u>COLUMN 12</u>:
Line 23, "over represent" should read --over-represent--.
Line 55, "carrier be" should read --carrier may be--.

<u>COLUMN 13</u>:
Line 4, "grouping" should read --a grouping--.

<u>COLUMN 15:</u>
Line 21, "the number" should read --number--.

Signed and Sealed this

Ninth Day of September, 2008

JON W. DUDAS
*Director of the United States Patent and Trademark Office*